United States Patent [19]

Kim

[11] Patent Number: 5,555,865
[45] Date of Patent: Sep. 17, 1996

[54] AIR FLOW CONTROL DEVICE FOR AN INTERNAL COMBUSTION ENGINE

[75] Inventor: Yoon-Suk Kim, Kyungki-Do, Rep. of Korea

[73] Assignee: Hyundai Motor Company, Ltd., Seoul, Rep. of Korea

[21] Appl. No.: 519,523

[22] Filed: Aug. 25, 1995

[30] Foreign Application Priority Data

Aug. 25, 1994 [KR] Rep. of Korea ...................... 94-21615

[51] Int. Cl.[6] .................................................. F02M 35/10
[52] U.S. Cl. ....................................................... 123/184.56
[58] Field of Search ........................ 123/184.56, 184.53, 123/184.47, 184.42, 184.34

[56] References Cited

U.S. PATENT DOCUMENTS

| | | | |
|---|---|---|---|
| 3,999,522 | 12/1976 | Jaulmes | 123/184.56 |
| 4,664,076 | 5/1987 | Miyano et al. | 123/184.56 |
| 4,691,670 | 9/1987 | Bonisch et al. | 123/184.56 |
| 4,907,547 | 3/1990 | Daly | 123/184.53 |
| 5,427,078 | 6/1995 | Hitomi et al. | 123/184.53 |

FOREIGN PATENT DOCUMENTS

| | | | |
|---|---|---|---|
| 0461087 | 12/1991 | European Pat. Off. | 123/184.56 |
| 58-192467 | 6/1983 | Japan | 123/184.53 |
| 2-291422 | 12/1990 | Japan | 123/184.56 |
| 5-187235 | 7/1993 | Japan | 123/184.53 |
| 2031999 | 4/1980 | United Kingdom | 123/184.56 |

*Primary Examiner*—David A. Okonsky
*Attorney, Agent, or Firm*—Birch, Stewart, Kolasch & Birch, LLP

[57] ABSTRACT

An air flow control device for an internal combustion engine includes a surge tank having a plurality of air passages and a plurality of on/off valves, a cylinder head of the internal combustion engine, and a plurality of high and low intake manifolds communicating with the surge tank and the cylinder head, whereby the plurality of on/off valves are selectively closed and opened depending upon an actuation for accelerating car speed in any condition of the car speed, and obtaining a high output force and torque.

5 Claims, 2 Drawing Sheets

AIR FLOW CONTROL DEVICE FOR AN INTERNAL COMBUSTION ENGINE

BACKGROUND OF THE INVENTION

1. Field of the Invention

The present invention relates to an air flow control device for an internal combustion engine and more particularly, to an improved air flow control device including a plurality of air passages, a plurality of on/off valves for selectively opening and closing the air passages depending upon the car speed for providing a torque, a high output force, and acceleration of the car.

2. Description of Related Art

Various types of air flow control devices for an internal combustion engine are known in the art. Generally, in the high speed engines, there are a plurality of intake manifolds and only one intake manifold can be used in the high speed state. However, it is difficult to control the intake manifolds and to close the high speed usage passage easily, and it is not ideal for improving the output force over an entire speed range of the engine.

SUMMARY OF THE INVENTION

Accordingly, it is an object of the invention to provide an air flow control device for an internal combustion engine, which eliminates the above problems encountered with the conventional air flow control devices.

Another object of the invention is to provide an improved air flow control device for an internal combustion engine, which device includes a surge tank, a cylinder head, and a plurality of high and low velocity intake manifolds for communicating with the surge tank and cylinder head, the surge tank being provided with a plurality of air passages and a plurality of on/off valves for selectively opening and closing the air passages so as to obtain torque and high output force, and accelerate car speed in any condition of car speed.

A further object of the present invention is to provide an air flow control device for an internal combustion engine which is simple in structure, inexpensive to manufacture, and durable in use.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an air flow control device for an internal combustion engine, which device includes a surge tank having a plurality of air passages and a plurality of on/off valves, a cylinder head of the internal combustion engine, and a plurality of high and low intake manifolds in communication with the surge tank and the cylinder head, whereby the plurality of on/off valves selectively close and open the plurality of air passages in response to an actuation for accelerating car speed in any condition of the car speed, and obtaining a high output force and torque.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE DRAWINGS

Figure 1:
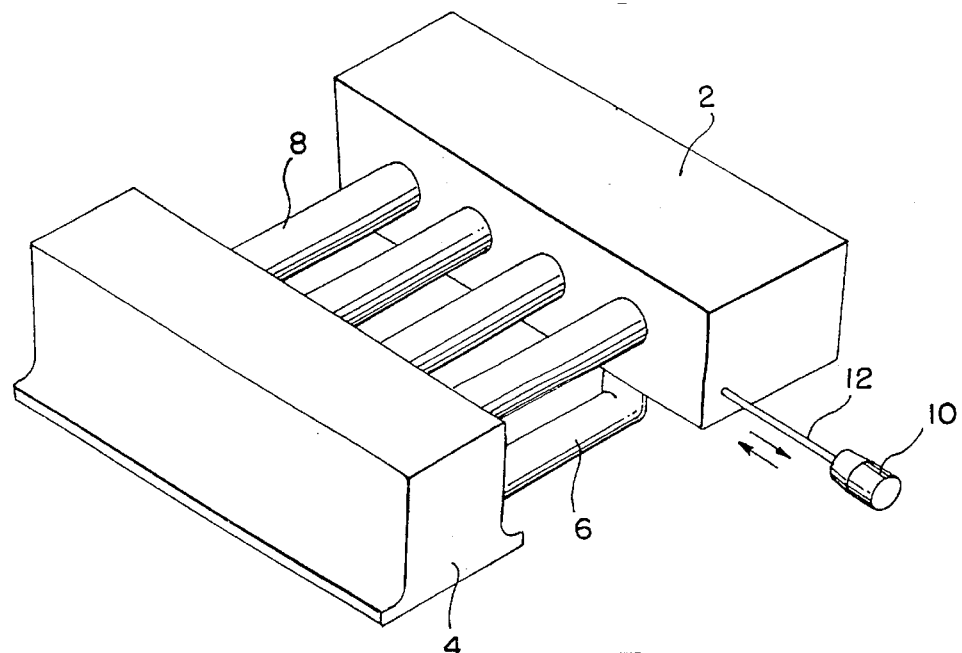
FIG. 1 is a perspective view of an air flow control device for an internal combustion engine according to the present invention.
Figure 2:
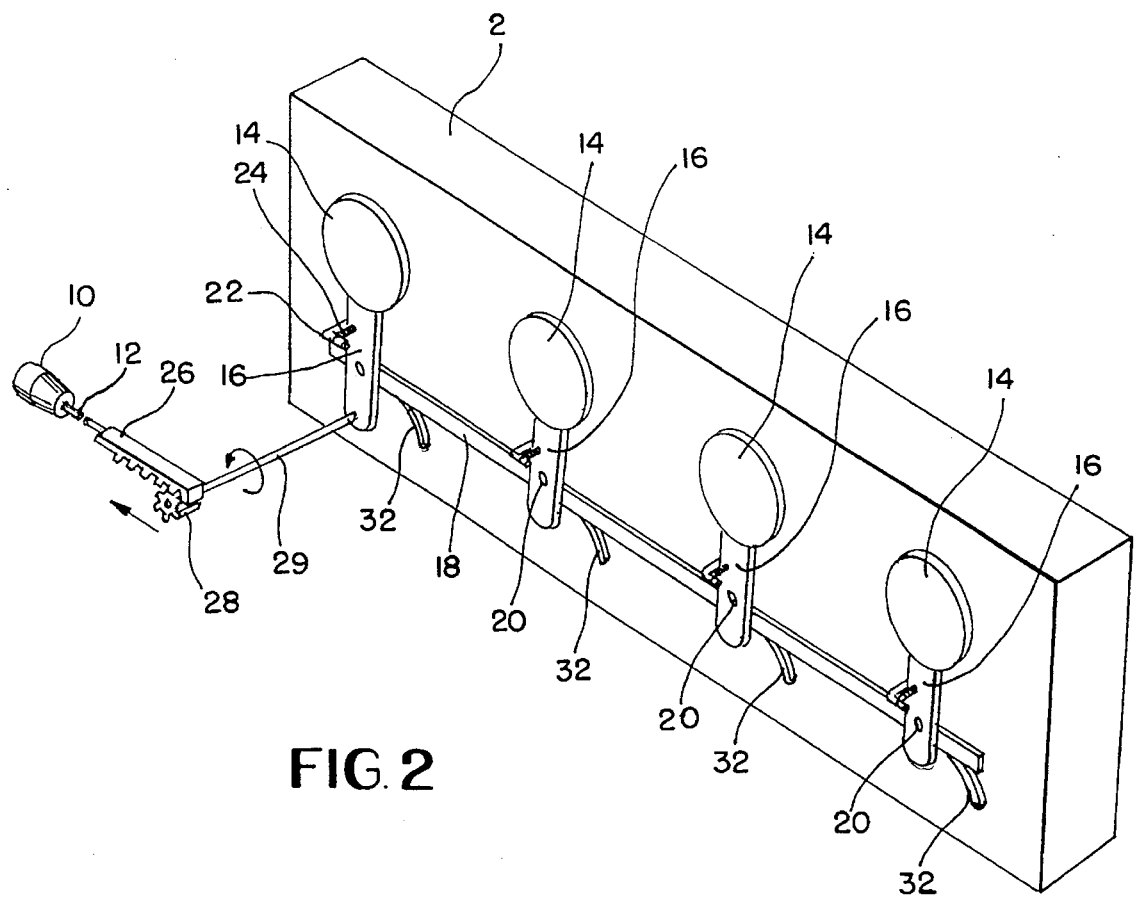
FIG. 2 is a perspective view of a surge tank of the air flow control device according to the present invention in a low speed position.
Figure 3:
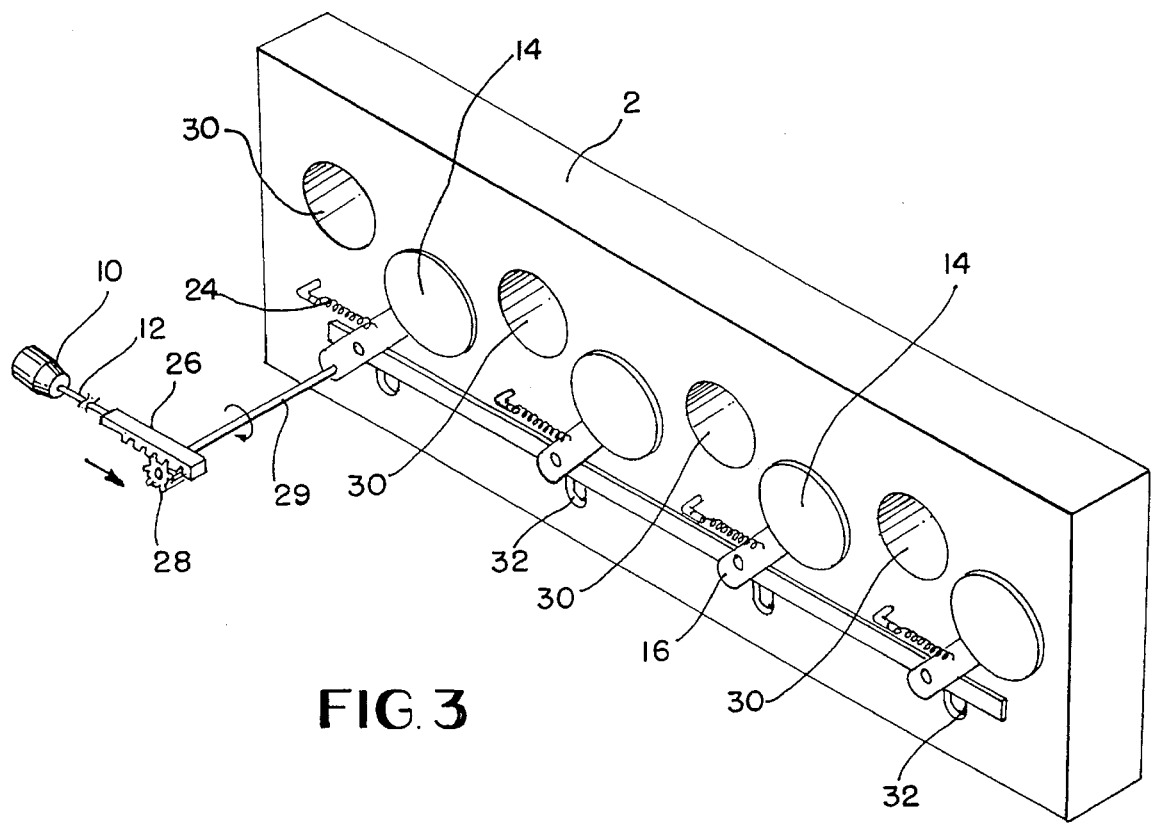
FIG. 3 is a perspective view of a surge tank of the air flow control device according to the present invention in a high speed position.

Referring now in detail to the drawings for the purpose of illustrating preferred embodiments of the present invention, the air flow control device for an internal combustion engine as shown in FIGS. 1, 2, and 3, includes a surge tank 2 for storing air, a cylinder head 4, and a plurality of low velocity and high velocity intake manifolds 6 and 8 connected to the surge tank 2 and the cylinder head 4, respectively.

The surge tank 2 is provided with an operating rod 12 of an actuator 10 wherein the operating rod 12 is slidably inserted into one side wall of the surge tank 2 so as to reciprocate motion in the direction indicated by arrows shown in FIGS. 1, 2, and 3. The operating rod 12 has a rack gear 26 in gearing relationship with a pinion gear 28.

As shown in FIGS. 2 and 3, the surge tank 2 includes a plurality of air passages 30, a seat 34 and a plurality of on/off valves 14 for opening and closing the seats 34 of the plurality of air passages 30. Each on/off valve 14 contains a lever arm 16 pivotally mounted to a long rod 18 for operating therewith as a composite structure. The most side lever arm 16 is fixed to a pinion rod 29 geared with the operating rod 12 of the actuator 10 for delivering a rotating force of the operating rod 12 to the lever arm 16.

Each on/off valve 14 is provided with a stopper 22 supported on an inner wall of the surge tank 2 and a spring 24 connected between the lever arm 16 and the stopper 22 for normally biasing the on/off valves 14 into a closed position over respective ones of said corresponding plurality of air passages 30 as shown in FIG. 3 and allow opening of the on/off valves 14 when the rotating force of the pinion rod 29 overcomes the normal bias of the spring 24.

Figure 4:
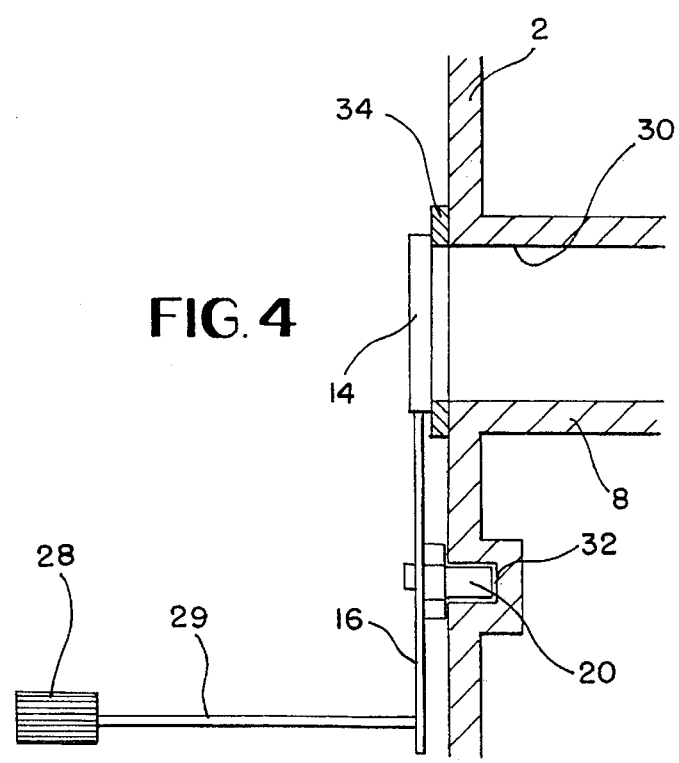
FIG. 4 is a cross-sectional view of an intake manifold of the air flow control device according to the present invention.

As shown in FIGS. 3 and 4, each operating rod 16 is stopped by the stopper 22 and biased by the spring 24 for the on/off valve 14 to move within a certain range. Also, the pin 20 is located in a slot 32 disposed on the inner wall of the surge tank 2 for the on/off valve 14 to slidably pivot since the pin 20 is rotated within the slot 32 by itself in a circular motion. The seats 34 disposed around the passages 30 function for the on/off valves 14 to tightly close the passage 30 so as to prevent air from leaking therefrom.

The air flow control device for an internal combustion engine according to the present invention operates as follows. In the low speed of the internal combustion engine, the operating rod 12 is moved backwardly by operation of the actuator 10. At this time, the pinion gear rotates in the counterclockwise direction indicated by the arrow shown in FIG. 2 by gearing with the rack gear 26 of the operating rod 12 of the actuator 10.

Accordingly, the passages 30 of the high velocity intake manifolds 8 is tightly closed by the on/off valves 14, so that the air does not flow through the high velocity intake manifolds 8 and instead flows through the low velocity intake manifolds 6. In this circumstance, the low velocity intake manifolds 6 are connected between the surge tank 2 and the cylinder head 4 as an elongated pipe, so that the air flow control device can obtain a torque and an output force and can save fuel in a congested/slow traffic area.

When the internal combustion engine is in a high speed, the operating rod 12 of actuator 10 is moved forwardly so as to rotate the pinion gear 28 in the clockwise direction by the arrow shown in FIG. 3 by gearing with the rack gear 26 of the operating rod 12 of the actuator 10.

Therefore, the on/off valves 14 move rightwardly and downwardly with the elongated rod 18 and the pins 20 independently rotate within the corresponding slot 32, so that the passages of the on/off valves 14 are opened. Accordingly, the air flow through the high and low velocity intake manifolds 8 and 6 for fully supplying the amount of air which is required by the high speed of the engine for obtaining a torque and an output force.

Accordingly, the air flow control device for an internal combustion engine according to the present invention has a number of advantages such as, for example, it is provided with a torque and a high output force, it can save fuel in the low and high speeds of the engine, and it is simple in structure and inexpensive to manufacture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air flow control device for an internal combustion engine, comprising:

a cylinder head of said internal combustion engine;

a plurality of low velocity and high velocity intake manifolds in communication with said cylinder head; and a surge tank for temporarily storing fresh air, said surge tank being in communication with said cylinder head through said low and high velocity intake manifolds, said surge tank including:

a plurality of air passages disposed in said surge tank, a plurality of on/off valve members for tightly opening and closing a corresponding one of each of the plurality of air passages, each said on/off valve member having a lever arm, an elongated rod linked in a transverse orientation to each of said lever arms by a respective hinge pin, a pinion rod having a first end fixed to a base end of one of the lever arms and extending perpendicularly therefrom, an operating rod of an actuator, slidably inserted into said surge tank and positioned parallel to said elongated rod, and means for gearing a second end of said pinion rod to said operating rod, wherein upon actuating said operating rod, said means for gearing is rotated in a selected direction to correspondingly rotate said pinion rod and thereby force the lever of said valve member to rotate through an arc in a direction corresponding to the direction of rotation of said pinion rod, said elongated rod simultaneously actuating a remainder of said lever arms in a like direction, whereby in low and high speeds of the internal combustion engine, the on/off valve members selectively open and close the plurality of air passages.

2. The air flow control device of claim 1, wherein said means for gearing includes a rack gear attached to said lever arm and a pinion gear attached to said pinion rod.

3. The air flow control device of claim 1, wherein each said lever arm includes a spring connected thereto and supported on said surge tank for normally biasing the on/off valve member into a closed position and wherein said surge tank includes a stopper supported thereon for stopping the motion of each said on/off valve member in the closed position, whereby each lever arm is effectively controlled between an open and closed position by the spring and the stopper.

4. The air flow control device of claim 1, wherein each said hinge pin is slidably located within a slot formed in said surge tank.

5. The air flow control device of claim 1, wherein said each air passage is provided with a seat disposed around the air passage for tightly mating with and freely releasing from a corresponding one of the on/off valve members, thereby closing and opening the air passages, respectively.

* * * * *